(12) United States Patent
Iba et al.

(10) Patent No.: US 11,664,496 B2
(45) Date of Patent: May 30, 2023

(54) CATHODE ACTIVE MATERIAL AND FLUORIDE ION BATTERY

(71) Applicant: TOYOTA JIDOSHA KABUSHIKI KAISHA, Toyota (JP)

(72) Inventors: Hideki Iba, Toyota (JP); Takeshi Tojigamori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 17/190,156

(22) Filed: Mar. 2, 2021

(65) Prior Publication Data

US 2021/0280858 A1    Sep. 9, 2021

(30) Foreign Application Priority Data

Mar. 6, 2020   (JP) .............................. JP2020-038864

(51) Int. Cl.
*H01M 4/00*   (2006.01)
*H01M 4/38*   (2006.01)
*H01M 4/02*   (2006.01)

(52) U.S. Cl.
CPC ........ *H01M 4/38* (2013.01); *H01M 2004/028* (2013.01)

(58) Field of Classification Search
CPC ... Y02E 60/10; H01M 4/38; H01M 2004/028; H01M 10/05
See application file for complete search history.

(56) References Cited

U.S. PATENT DOCUMENTS

| 2016/0087308 A1 | 3/2016 | Nakamoto et al. |
| 2018/0342763 A1* | 11/2018 | Miki .................... H01M 4/485 |
| 2019/0296276 A1* | 9/2019 | Bradwell ............ H01M 50/186 |
| 2019/0348677 A1 | 11/2019 | Miki |

FOREIGN PATENT DOCUMENTS

| JP | 2016-062821 A | 4/2016 |
| JP | 2017-084506 A | 5/2017 |
| JP | 2018-198130 A | 12/2018 |
| JP | 2019-200852 A | 11/2019 |
| JP | 2020-009578 A | 1/2020 |

OTHER PUBLICATIONS

Tan L.K. et al. "Effects of rare earth additions on structures and properties of rapidly solidified coppper alloys", Materials Science and Technology, vol. 15, No. 2, Feb. 19, 1999 (Feb. 9, 1999), pp. 169-179.

* cited by examiner

*Primary Examiner* — Cynthia H Kelly
*Assistant Examiner* — Monique M Wills
(74) *Attorney, Agent, or Firm* — Oliff PLC

(57) ABSTRACT

A main object of the present disclosure is to provide a cathode active material with excellent capacity properties. In order to achieve the object, the present disclosure provides a cathode active material to be used in a fluoride ion battery wherein the cathode active material mainly contains a metal element M and a metal element M'; the metal element M is at least one kind of Cu, Fe and Mn; and the metal element M' is at least one kind of Y, La, Ce, Pr, Nd, Sm, Eu, Gd, Tb, Dy, Ho and Yb.

17 Claims, 3 Drawing Sheets

CATHODE ACTIVE MATERIAL AND FLUORIDE ION BATTERY

TECHNICAL FIELD

The present disclosure relates to a cathode active material and a fluoride ion battery.

BACKGROUND ART

As high-voltage and high-energy density batteries, for example, Li ion batteries are known. The Li ion battery is a cation-based battery utilizing the reaction of Li ions with cathode active materials, and the reaction of Li ions with anode active materials. Meanwhile, as anion-based batteries, fluoride ion batteries utilizing the reaction of fluoride ions (fluoride anions) are known. For example, Non-Patent Literature 1 discloses Cu as an active material used for a fluoride ion battery.

For example, Patent Literature 1 discloses that a cathode active material including one or more of Au, Pt, S, Ag, Co, Mo, Cu, W, V, Sb, Bi, Sn, Ni, Pb, Fe and Cr is used in a fluoride ion battery. Also, Patent Literature 2 discloses that a cathode active material having a composition represented by $Pb_{2-x}Cu_{1+x}F_6$ ($0 \leq x < 2$) is used in a fluoride ion battery. In addition, Patent Literature 3 discloses a fluoride ion secondary battery using Cu as a cathode active material.

CITATION LIST

Patent Literatures

Patent Literature 1: Japanese Patent Application Laid-Open (JP-A) No. 2017-084506
Patent Literature 2: JP-A No. 2019-200852
Patent Literature 3: JP-A No. 2016-062821

SUMMARY OF DISCLOSURE

Technical Problem

As the cathode active material used in a fluoride ion battery, an active material with excellent capacity properties has been demanded. The present disclosure has been made in view of the above circumstances and a main object thereof is to provide a cathode active material of which capacity properties are excellent.

Solution to Problem

In order to achieve the object, the present disclosure provides a cathode active material to be used in a fluoride ion battery, wherein the cathode active material is an alloy mainly containing a metal element M and a metal element M'; the metal element M is at least one kind of Cu, Fe and Mn; the metal element M' is at least one kind of Y, La, Ce, Pr, Nd, Sm, Eu, Gd, Tb, Dy, Ho and Yb.

According to the present disclosure, the cathode active material is an alloy containing a specified metal element, and thus the cathode active material is allowed to have excellent capacity properties.

In the disclosure, the metal element M may include at least Cu.

In the disclosure, the metal element M' may include at least one kind of Y, La, Pr, Nd, Sm, Tb and Dy.

In the disclosure, the metal element M' may include at least La.

In the disclosure, the alloy may have the composition represented by $Cu_{1-x}La_x$ ($0.09 \leq x \leq 0.5$).

In the disclosure, the alloy may have a composition represented by $Cu_{1-x}La_x$ ($0.24 \leq x \leq 0.5$).

In the disclosure, the metal element M may include at least Fe.

In the disclosure, the metal element M' may include at least one of La and Ce.

In the disclosure, the alloy may have a composition represented by $Fe_{1-x}La_x$ ($0.1 \leq x \leq 0.5$).

In the disclosure, the alloy may have a composition represented by $Fe_{1-x}Ce_x$ ($0.1 \leq x \leq 0.5$).

In the disclosure, the metal element M may include at least Mn.

In the disclosure, the metal element M' may include at least La.

In the disclosure, the alloy may have a composition represented by $Mn_{1-x}La_x$ ($0.1 \leq x \leq 0.5$).

The present disclosure also provides a fluoride ion battery including a cathode active material layer, an anode active material layer, and an electrolyte layer formed between the cathode active material layer and the anode active material layer; wherein the cathode active material layer contains the above described cathode active material.

According to the present disclosure, usage of the above described cathode active material allows the fluoride ion battery to have excellent capacity properties.

Advantageous Effects of Disclosure

The present disclosure exhibits an effect of providing a cathode active material with excellent capacity properties.

DESCRIPTION OF EMBODIMENTS

Figure 1:
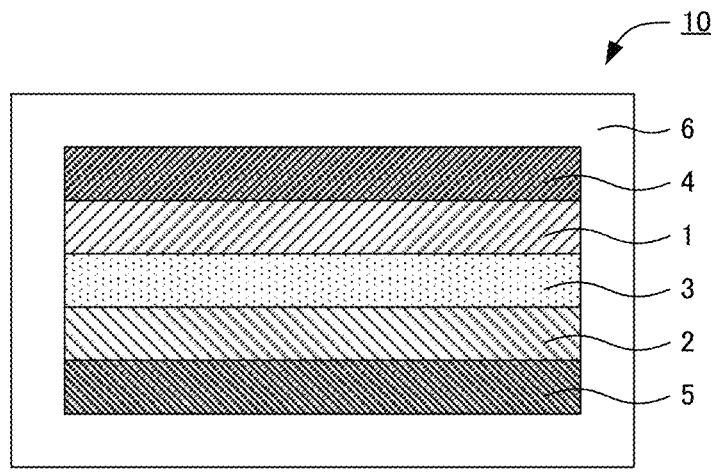
FIG. 1 is a schematic cross-sectional view illustrating an example of the fluoride ion battery in the present disclosure.

The cathode active material and the fluoride ion battery in the present disclosure will be hereinafter described in details.

A. Cathode Active Material

The cathode active material in the present disclosure is a cathode active material to be used in a fluoride ion battery, wherein the cathode active material is an alloy mainly containing a metal element M and a metal element M'; the metal element M is at least one kind of Cu, Fe and Mn; the metal element M' is at least one kind of Y, La, Ce, Pr, Nd, Sm, Eu, Gd, Tb, Dy, Ho and Yb.

According to the present disclosure, the cathode active material is an alloy containing a specified metal element, and thus the cathode active material is allowed to have excellent capacity properties. As described above, it has been known that transition metals belonging to the fourth period such as Cu is used as the cathode active material in a fluoride ion battery. However, when Cu is used, an insulating transition metal fluoride is generated during charging process. Ion conduction would be interfered if the transition metal fluoride covers the surface of the active material, and thus it would be difficult to supply ions to the center of the active material. As a result, charging reaction may not complete and the exact capacity as the theoretical capacity may not be obtained. In such a case, it is required to adjust (refine) the particle size of the active material to nano-size. In addition, when an electrode having a high ratio of the refined active material is to be produced, the electrolyte (solid electrolyte) also needs the refinement treatment similarly to that of the active material. If the refinement treatment of the electrolyte is not conducted, it would be difficult to produce an electrode having both the electron conduction path and the ion conduction path, and it would be difficult to highly densify the energy of the battery. However, if the refinement treatment of the electrolyte is conducted, the ion conductivity may be deteriorated.

On the other hand, the cathode active material in the present disclosure is an alloy containing a metal element M' (element of group 3 or lanthanoid-based element that can express fluoride ion conductivity) in addition to a metal element M that is a transition metal belonging to the fourth period. When the cathode active material is such an alloy, the metal element M' will be fluorinated at the initial charging, and M'Fx capable of working as a solid electrolyte will be formed inside the alloy. When this M'Fx phase is diffused by the fluoride ions, the fluoride ions may be supplied to the center of the active material (center of alloy). As a result, the active material may have excellent capacity properties. In addition, the cathode active material in the present disclosure has excellent diffusibility of fluoride ions without conducting the refinement treatment, and thus can be used in a comparatively large particle size. Further, the refinement of the solid electrolyte is unnecessary, and thus the deterioration of the ion conductivity may also be inhibited.

1. Alloy

The alloy in the present disclosure is an alloy mainly containing a metal element M and a metal element M'.

"Mainly containing a metal element M and a metal element M'" means that the later described total ratio of the metal element M and the metal element M' is the most with respect to all the elements configured in the alloy (cathode active material). The total ratio of the metal element M and the metal element M' with respect to all the elements configured in the cathode active material is, for example, 50 at % or more, may be 70 at % or more, may be 90 at % or more, may be 95 at % or more, may be 99 at % or more, and may be 100 at %. The composition of the cathode active material may be determined by, for example, dissolving the cathode active material in an acid and measuring with an ICP atomic emission spectrophotometry (ICP-OES).

Also, the ratio of the metal element M' with respect to the total of the metal element M and the metal element M' is, for example, 5 at % or more, may be 10 at % or more, and may be 20 at % or more. Meanwhile, the ratio of the metal element M' is, for example, 50 at % or less, may be 40 at % or less, may be 35 at % or less, and may be 30 at % or less.

The metal element M is a transition metal belonging to the fourth period, and the metal element M' has fluoride ion conductivity, and is an element of group 3, or a lanthanoid-based element. The metal element is usually at least one kind of Cu, Fe, and Mn. The alloy in the present disclosure may contain just one kind of the aforementioned elements, or may contain two kinds or more thereof as the metal element M. The metal element M' is, usually, at least one kind of Y, La, Ce, Pr, Nd, Sm, Eu, Gd, Tb, Dy, Ho and Yb. The alloy in the present disclosure may contain just one kind of the aforementioned elements, or may contain two kinds or more thereof. In addition, in comparison of a fluoride MF which is fluorinated metal element M with a fluoride M'F which is fluorinated metal element M', it is preferable that the ion conductivity of the fluoride M'F is higher than the ion conductivity of the fluoride MF. The metal element M and the metal element M' may be selected so that the said relationship is obtained.

The fluorination potential of the metal element M' may be higher or lower than the fluorination potential of the metal element M, but the latter is preferable. The reason therefor is to fluorinate the metal element M' first to form a good fluorine ion conduction path in the alloy.

When the metal element M includes at least Cu, the metal element M' preferably includes at least one kind of Y, La, Pr, Nd, Sm, Tb and Dy, and more preferably includes at least La. The reason therefor is to have a good charge capacity.

When the alloy includes at least Cu as the metal element M and includes at least La as the metal element M', the alloy preferably has the composition represented by $Cu_{1-x}La_x$ (0.09≤x≤0.5), and more preferably has the composition represented by $Cu_{1-x}La_x$ (0.24≤x≤0.5). The reason therefor is to have good coulomb efficiency (initial discharge capacity/initial charge capacity).

In addition, when the metal element M includes at least Fe, the metal element M' preferably includes at least one of Ce and La. When the alloy includes at least Fe and Ce, it is preferable that the alloy has the composition represented by $Fe_{1-x}Ce_x$ (0.1≤x≤0.5). In the composition, x may be 0.2 or more, and may be 0.3 or more. Meanwhile, x may be 0.4 or less. In addition, when the alloy includes at least Fe and La, it is preferable that the alloy has the composition represented by $Fe_{1-x}La_x$ (0.1≤x≤0.5). In the composition, x may be 0.2 or more, and may be 0.3 or more. Meanwhile, x may be 0.4 or less.

Further, when the metal element M includes at least Mn, the metal element M' preferably includes at least La. In this case, it is preferable that the alloy has the composition represented by $Mn_{1-x}La_x$ (0.1≤x≤0.5). In the composition, x may be 0.2 or more, and may be 0.3 or more. Meanwhile, x may be 0.4 or less.

2. Cathode Active Material

The cathode active material in the present disclosure is the above described alloy.

There are no particular limitations on the shape of the cathode active material in the present disclosure, and examples thereof may include a granular shape. The average particle size ($D_{50}$) of the cathode active material is, for example, 0.1 μm or more, may be 0.3 μm or more, and may be 1 μm or more. Meanwhile, the average particle size ($D_{50}$) is, for example, 20 μm or less, may be 15 μm or less, may be 10 μm or less, and may be 5 μm or less. If the average particle size is too small, there may be a possibility that the ion conduction path among electrolytes may not be sufficiently formed when the ratio of the cathode active material in the cathode active material layer is increased. On the other hand, if the average particle size is too large, there may be a possibility that ions and electrons may not be easily diffused inside the active material. Incidentally, the average particle size ($D_{50}$) of the cathode active material may be obtained from, for example, the result of particle distribution measurement with laser diffraction scattering method.

There are no particular limitations on the method for producing the cathode active material in the present disclosure if the method allows the intended cathode active material to be obtained, and examples thereof may include an ark melting method and a mechanical alloying method.

B. Fluoride Ion Battery

FIG. 1 is a schematic cross-sectional view illustrating an example of the fluoride ion battery in the present disclosure. Fluoride ion battery 10 illustrated in FIG. 1 comprises cathode active material layer 1, anode active material layer 2, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. The present disclosure features the configuration that the cathode active material layer 1 contains the cathode active material described in "A. Cathode active material" above. According to the present disclosure, usage of the above described cathode active material allows the fluoride ion battery to have excellent capacity properties.

1. Cathode Active Material Layer

The cathode active material layer in the present disclosure is a layer containing at least the above described cathode active material. The cathode active material is in the same contents as those described in "A. Cathode active material" above. The cathode active material layer may contain just the above described cathode active material, or may contain an additional active material. In the latter case, the ratio of the above described cathode active material to the entire active materials is, for example, 85 weight % or more, may be 90 weight % or more, may be 95 weight % or more, and may be 99 weight % or more.

The content of the cathode active material in the cathode active material layer is, for example, 10 weight % or more and 90 weight % or less, and may be 20 weight % or more and 80 weight % or less.

Also, the cathode active material layer may further contain at least one of a conductive material, a binder, and an electrolyte, as required. There are no particular limitations on the conductive material if it has desired electron conductivity, and examples of the conductive material may include a carbon material. Examples of the carbon material may include carbon black such as acetylene black, Ketjen black, furnace black and thermal black, graphene, fullerene, and carbon nanotube. The content of the conductive material in the cathode active material layer is, for example, 1 weight % or more, may be 5 weight % or more, and may be 10 weight % or more. Meanwhile, the content of the conductive material is, for example, 20 weight % or less, and may be 15 weight % or less. If the proportion of the conductive material is too little, there is a possibility excellent electron conducting path may not be formed, and if the proportion of the conductive material is too much, the proportion of the active material would be relatively little, and there is a possibility the energy density may decrease.

There are no particular limitations on the binder if it is chemically and electronically stable, and examples of the binder may include a fluorine-based binder such as polyvinylidene fluoride (PVDF) and polytetra fluoroethylene (PTFE).

The electrolyte is in the same contents as those described in "3. Electrolyte layer" later." The thickness of the cathode active material layer is, for example, 0.1 μm or more and 1000 μm or less.

2. Anode Active Material Layer

The anode active material layer in the present disclosure is a layer containing at least an anode active material. Also, the anode active material layer may further contain at least one of a conductive material, an electrolyte, and a binder as required.

As the anode active material, an arbitrary active material having lower potential than that of the cathode active material can be selected. Examples of the anode active material may include a simple substance of metal, an alloy, a metal oxide, and fluorides of these. Examples of the metal element included in the anode active material may include La, Ca, Al, Eu, Li, Si, Ge, Sn, In, V, Cd, Cr, Fe, Zn, Ga, Ti, Nb, Mn, Yb, Zr, Sm Ce, Mg, and Pb. Among them, the anode active material is preferably Mg, $MgF_x$, Al, $AlF_x$, La, $LaF_x$, Ce, $CeF_x$, Ca, $CaF_x$, Pb, and $PbF_x$. Incidentally, the x is a real number larger than 0.

Regarding the conductive material and the binder, the same materials described in the "1. Cathode active material layer" above may be used. The electrolyte is in the same contents as those described in "3. Electrolyte layer"; thus, the description herein is omitted.

The content of the anode active material in the anode active material layer is preferably larger from the viewpoint of capacity; for example, it is 30 weight % or more, preferably 50 weight % or more, and more preferably 70 weight % or more. Also, the thickness of the anode active material layer is, for example, 0.1 μm or more and 1000 μm or less.

3. Electrolyte Layer

The electrolyte layer in the present disclosure is a layer formed between the cathode active material layer and the anode active material layer. The electrolyte configured in the electrolyte layer may be an electrolyte solution (liquid electrolyte), may be a polymer electrolyte, and may be an inorganic solid electrolyte.

The liquid electrolyte contains, for example, a fluoride salt and a solvent. Examples of the fluoride salt may include an inorganic fluoride salt, an organic fluoride salt, and an ionic solution. Examples of the inorganic fluoride salt may include XF (X is Li, Na, K, Rb, or Cs). Examples of the cation of the organic fluoride salt may include an alkyl ammonium cation such as a tetramethyl ammonium cation. The concentration of the fluoride salt in the liquid electrolyte is, for example, 0.1 mol/L or more, may be 0.3 mol/L or more, and may be 0.5 mol/L or more. Meanwhile, the concentration of the fluoride salt is, for example, 6 mol/L or less, and may be 3 mol/L or less.

Examples of the solvent may include a cyclic carbonate such as ethylene carbonate (EC), fluoroethylene carbonate (FEC), difluoroethylene carbonate (DFEC), propylene carbonate (PC), and butylene carbonate (BC); a chain carbonate such as dimethyl carbonate (DMC), diethyl carbonate (DEC), and ethyl methyl carbonate (EMC); a chain ether such as diethyl ether, 1,2-dimethoxy methane, and 1,3-dimethyoxy propane; a cyclic ether such as tetrahydrofuran and 2-methyl tetrahydrofuran; a cyclic sulfone such as sulfolane; a chain sulfone such as dimethyl sulfoxide (DMSO); a cyclic ester such as γ-butyrolactone; a nitrile such as acetonitrile; and an arbitrary mixture of these. The polymer electrolyte may be obtained by, for example, adding a polymer to an electrolyte solution for gelling the solution.

Meanwhile, examples of the inorganic solid electrolyte may include a fluoride of lanthanoid element such as La and Ce; a fluoride of alkali metal element such as Li, Na, K, Rb, and Cs; and a fluoride of alkaline earth element such as Ca, Sr, and Ba. Also, it is preferable that the inorganic solid electrolyte is a fluoride that contains at least one kind of metal elements La, Ba, Pb, Sn, Ca, and Ce. The inorganic solid electrolyte may contain just one kind of the aforementioned metal elements, and may contain two kinds or more thereof. Specific examples of the inorganic solid electrolyte may include $La_{1-x}Ba_xF_{3-x}$ (0≤x≤2), $Pb_{2-x}Sn_xF_4$ (0≤x≤2), $Ca_{2-x}Ba_xF_4$ (0≤x≤2), and $Ce_{1-x}Ba_xF_{3-x}$ (0≤x≤2). Each of the x may be larger than 0, may be 0.3 or more, may be 0.5 or more, and may be 0.9 or more. Also, each of the x may be smaller than 1, may be 0.9 or less, may be 0.5 or less, and may be 0.3 or less. There are no particular limitations on the shape of the inorganic solid electrolyte, and examples thereof may include a granular shape.

4. Other Constitutions

The fluoride ion battery in the present disclosure comprises at least the above described cathode active material layer, anode active material layer and electrolyte layer. Further, the battery usually comprises a cathode current collector configured to collect currents of the cathode active material layer, an anode current collector configured to collect currents of the anode active material layer, and a battery case configured to store the above described members. The materials of the cathode current collector, the anode current collector, and the battery case may be conventionally known materials. Incidentally, examples of the shape of the current collectors may include a foil shape, a mesh shape, and a porous shape. Also, the fluoride ion battery may comprise a separator between the cathode active material layer and the anode active material layer. By arranging the separator, a battery with higher safety may be obtained.

5. Fluoride Ion Battery

The fluoride ion battery in the present disclosure may be a liquid-based battery and may be an all solid state battery, but preferably the all solid state battery. In addition, the fluoride ion battery in the present disclosure may be a primary battery and may be a secondary battery, but preferably a secondary battery. The reason therefor is to be repeatedly charged and discharged and useful as a car-mounted battery for example. Also, examples of the shape of the fluoride ion battery in the present disclosure may include a coin shape, a laminate shape, a cylindrical shape and a square shape.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Production of Cathode Active Material>

Cu and Y were weighed so as to obtain a composition of $Cu_2Y$. Then, both the metal elements were melted by an ark melting method to form an alloy. After that, a ribbon of the alloy was produced by a liquid quenching method. Then, the alloy ribbon was crushed with a mortar to obtain power alloy (cathode active material). Incidentally, $Cu_2Y$ corresponds to the composition of $M_{1-x}M'_x$ wherein M is Cu, M' is Y, and x is 0.33.

<Production of Evaluation Battery>

The produced $Cu_2Y$ powder, a solid electrolyte ($La_{0.9}Ba_{0.1}F_{2.9}$), and a conductive material (VGCF) were mixed in a weight ratio of 30:60:10 by ball milling (rotation number: 100 rpm), and thereby a cathode active material mixture was obtained. The obtained mixture (working electrode), a solid electrolyte ($La_{0.9}Ba_{0.1}F_{2.9}$) to form a solid electrolyte layer, a counter electrode produced by mixing $PbF_2$ and a conductive material (acetylene black) in a ratio of 95:5, and a Pb foil were compression-power-molded. Thereby, an evaluation battery was obtained.

Examples 2 to 14

An evaluation battery was respectively obtained in the same manner as in Example 1 except that the composition of the alloy was changed to those described in Table 1. Incidentally, the compositions in Examples 2 to 7 and 12 correspond to the composition of $M_{1-x}M'_x$ wherein x is 0.33. Also, the composition in Example 9 corresponds to the composition of $M_{1-x}M'_x$ wherein x is 0.14. Also, the composition in Example 11 corresponds to the composition of $M_{1-x}M'_x$ wherein x is 0.5.

Comparative Example 1

An evaluation battery was obtained in the same manner as in Example 1 except that simple substance of Cu was used as the cathode active material.

[Evaluation]

<Observation with Microscope>

The shape of the cathode active material obtained in Example 10 was observed by conducting a SEM-EDX (Scanning Electron Microscope-Energy Diffusing X-ray spectroscopy) measurement. SEM-EDX mapping images obtained are shown in FIG. 2.

Figure 2:
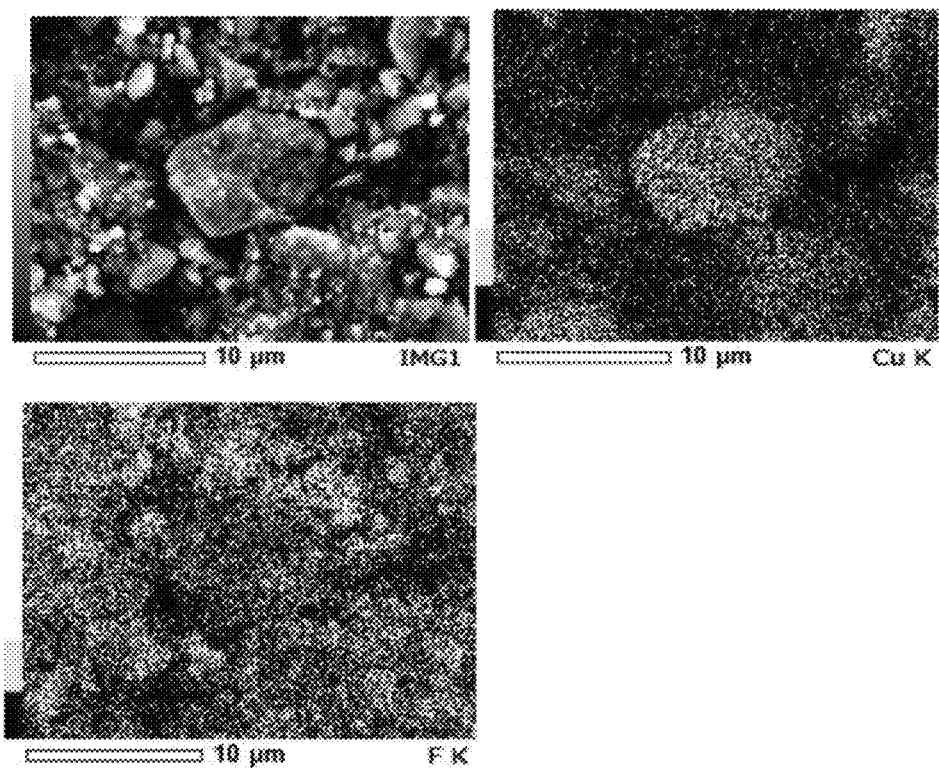
FIG. 2 is an SEM-EDX image of the cathode active material obtained in Example 10.

As shown in FIG. 2, an alloy of $Cu_{0.76}La_{0.24}$ in a size of about 5 μm was confirmed in the center of the images.

<Charge and Discharge Test>

Charge and discharge tests were conducted to the evaluation batteries obtained in Examples 1 to 14 and Comparative Example 1. The conditions of the charge and discharge tests were as follows: temperature: 140° C., final potential in the working electrode: −1.5 V (vs Pb/$PbF_2$) to 3 V (vs Pb/$PbF_2$), and current: 50 ρA/cm². The capacity per weight of the transition metal in the initial charge and the initial discharge is respectively shown in Tale 1. In addition, charge and discharge curves of Examples 2, 12, 13 and 14 are shown in FIG. 3 to FIG. 6. Incidentally, FIG. 4 (Example 12) shows the result of three times of the charge and discharge cycle.

TABLE 1

| | Composition | Capacity per transition metal (mAh/g) | |
|---|---|---|---|
| | | Initial charge | Initial discharge |
| Comparative Example 1 | Cu | 98 | 30 |
| Example 1 | $Cu_2Y$ | 413 | 39 |
| Example 2 | $Cu_2La$ | 1235 | 622 |
| Example 3 | $Cu_2Pr$ | 1115 | 318 |
| Example 4 | $Cu_2Nd$ | 937 | 252 |
| Example 5 | $Cu_2Sm$ | 1111 | 282 |
| Example 6 | $Cu_2Tb$ | 767 | 117 |
| Example 7 | $Cu_2Dy$ | 870 | 141 |
| Example 8 | $Cu_{0.91}La_{0.09}$ | 395 | 215 |
| Example 9 | $Cu_6La$ | 574 | 266 |
| Example 10 | $Cu_{0.76}La_{0.24}$ | 993 | 528 |
| Example 11 | CuLa | 1985 | 290 |
| Example 12 | $Fe_2La$ | 1669 | 1279 |
| Example 13 | $Fe_{0.8}Ce_{0.2}$ | 1398 | 1046 |
| Example 14 | $Mn_{0.8}La_{0.2}$ | 716 | 62 |

As shown in Table 1, the charge capacity and the discharge capacity of Examples 1 to 14 were respectively superior to those of Comparative Example 1, especially superior in the charge capacity. In addition, the coulomb efficiency of Examples 2, 8, 10, 12 and 13 was respectively 50% or more. In particular, the coulomb efficiency of Examples 12 and 13 was respectively 75% or more, which was superior to the others.

Figure 3:
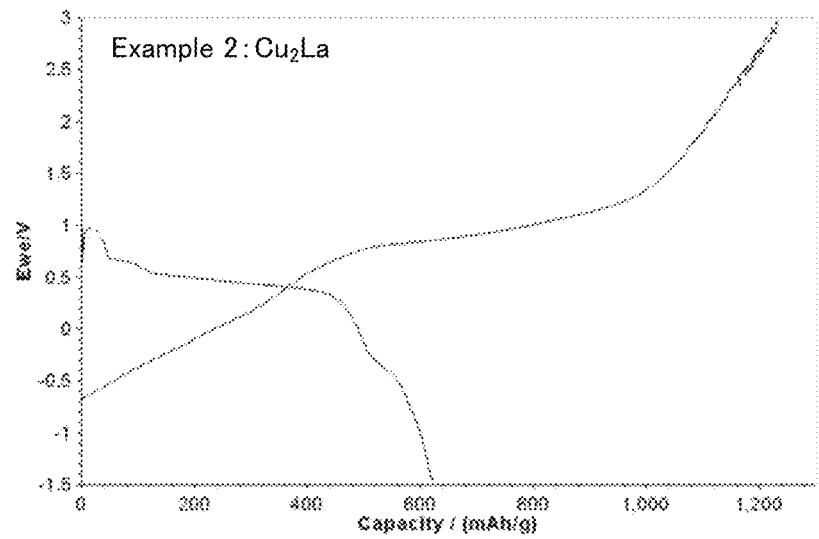
FIG. 3 is the result of a charge and discharge test of an evaluation battery obtained in Example 2.

As shown in FIG. 3, in Example 2 ($Cu_2La$), the charge capacity of over 1200 mAh/g was obtained, and the discharge capacity was also over 600 mAh/g. The plateaus of both charge and discharge were confirmed around the redox potential of Cu at 0.6 V, which confirmed the reaction of Cu. In this manner, a battery using the cathode active material of Example 2 is a battery having high energy density since the reaction potential is high and thus large electromotive force can be obtained.

Figure 4:
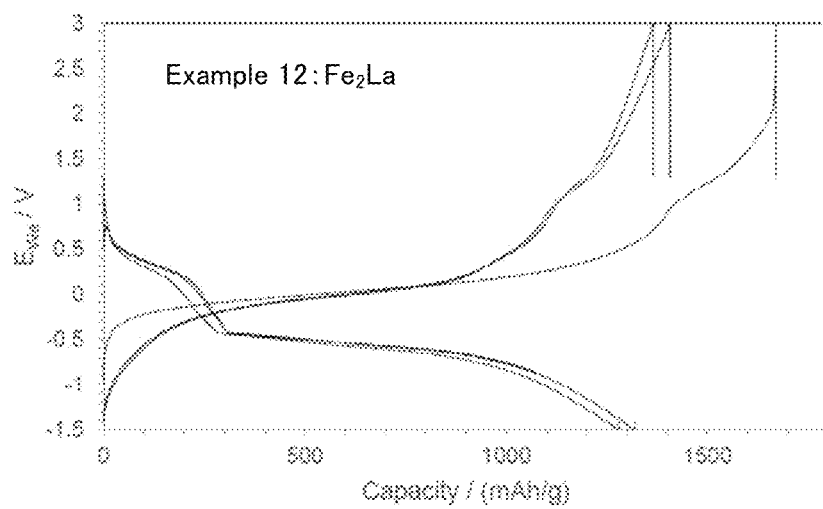
FIG. 4 is the result of a charge and discharge test of an evaluation battery obtained in Example 12.

As shown in FIG. 4, in Example 12 ($Fe_2La$), the charge capacity of all three cycles was respectively over 1300 mAh/g, which confirmed that the reaction reversibly proceeded.

Figure 5:
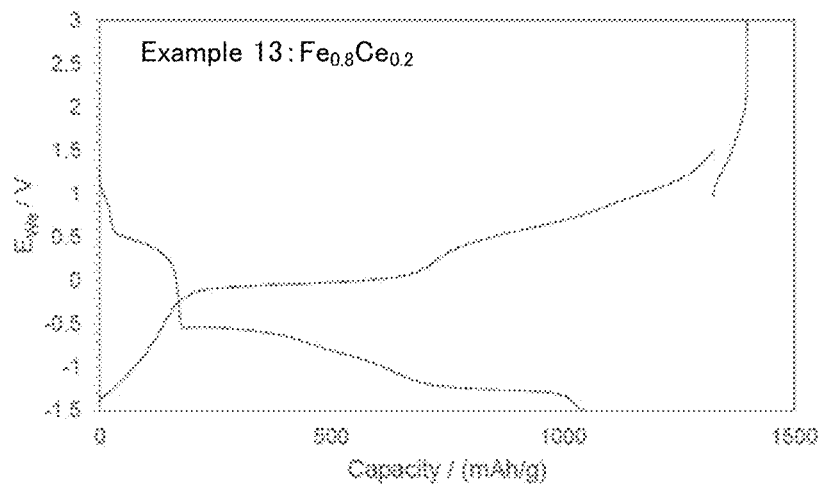
FIG. 5 is the result of a charge and discharge test of an evaluation battery obtained in Example 13.

As shown in FIG. 5, in Example 13 ($Fe_{0.8}Ce_{0.2}$), the charge capacity of 1398 mAh/g was obtained, and the discharge capacity was also 1064 mAh/g. In addition, multistage plateaus were confirmed. Those were presumably the reaction of $Fe^0 \to Fe^{2+} \to Fe^{3+} \to Fe^{4+}$. Incidentally, a part of the charge curve in FIG. 4 is broken because the measurement was suspended once during charge, and the measurement was conducted again. From Examples 12 and 13, it was confirmed that extremely large capacity was obtained when Fe was used as the transition element.

Figure 6:
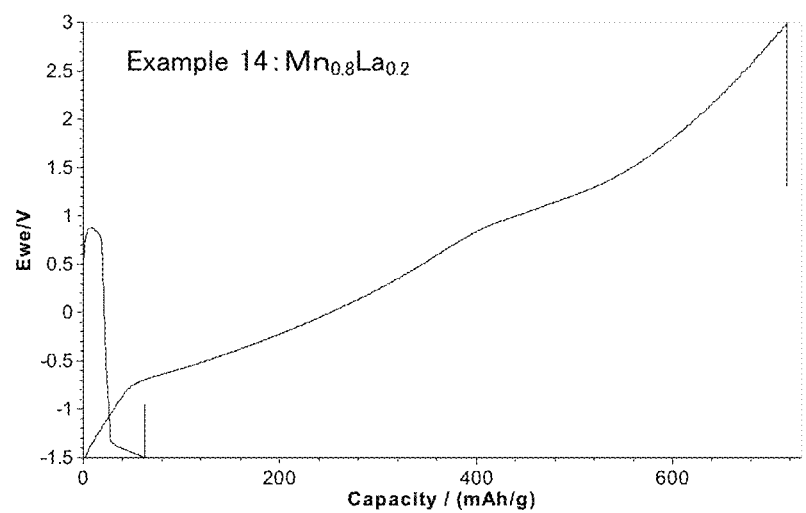
FIG. 6 is the result of a charge and discharge test of an evaluation battery obtained in Example 14.

As shown in FIG. 6, in Example 14 ($Mn_{0.8}La_{0.2}$), the charge capacity of over 700 mAh/g was obtained, and the discharge capacity was also over 60 mAh/g. In addition, plateau was confirmed around 0.8 V of the discharge curve, which confirmed the reaction at a high potential. For this reason, although the discharge capacity of Example 14 was inferior to that of other Examples using Cu or Fe, it was confirmed that the battery reaction at a high potential was conducted.

Comparative Examples 2 to 4

An evaluation battery was respectively produced in the same manner as in Example 1 except that the composition of the alloy was respectively changed to those described in Table 2. Charge and discharge tests were conducted to each of the evaluation battery obtained, and the initial charge capacity and the initial discharge capacity were respectively obtained. The results are shown in Table 2.

TABLE 2

| | | Capacity per transition metal (mAh/g) | |
|---|---|---|---|
| | Composition | Initial charge | Initial discharge |
| Comparative Example 2 | $Al_{65}Cu_{23}Fe_{12}$ | 312 | 3 |
| Comparative Example 3 | $AlB_2$ | 290 | 9 |
| Comparative Example 4 | TiCr | 103 | 25 |

As shown in Table 2, it was confirmed that sufficient initial charge capacity and initial discharge capacity were not obtained in Comparative Example 2 using the alloy not containing the metal element M', and in Comparative Examples 3 and 4 using the alloy containing neither the metal element M nor the metal element M'.

REFERENCE SINGS LIST 1 cathode active material layer
2 anode active material layer
3 electrolyte layer
4 cathode current collector
5 anode current collector
6 battery case
10 battery

What is claimed is:

1. A cathode active material to be used in a fluoride ion battery, wherein
   the cathode active material is an alloy consisting of a metal element M and a metal element M';
   the metal element M is at least one of Cu, Fe and Mn;
   the metal element M' is at least one of Y, La, Ce, Pr, Nd, Sm, Eu, Gd, Tb, Dy, Ho and Yb.

2. The cathode active material according to claim 1, wherein the metal element M includes at least Cu.

3. The cathode active material according to claim 2, wherein the metal element M' includes at least one of Y, La, Pr, Nd, Sm, Tb and Dy.

4. The cathode active material according to claim 2, wherein the metal element M' includes at least La.

5. The cathode active material according to claim 1, wherein the alloy has a composition represented by $Cu_{1-x}La_x$ wherein x is 0.09 or more and 0.5 or less.

6. The cathode active material according to claim 1, wherein the alloy has a composition represented by $Cu_{1-x}La_x$ wherein x is 0.24 or more and 0.5 or less.

7. The cathode active material according to claim 1, wherein the metal element M includes at least Fe.

8. The cathode active material according to claim 7, wherein the metal element M' includes at least one of La and Ce.

9. The cathode active material according to claim 1, wherein the alloy has a composition represented by $Fe_{1-x}La_x$ wherein x is 0.1 or more and 0.5 or less.

10. The cathode active material according to claim 1, wherein the alloy has a composition represented by $Fe_{1-x}Ce_x$ wherein x is 0.1 or more and 0.5 or less.

11. The cathode active material according to claim 1, wherein the metal element M includes at least Mn.

12. The cathode active material according to claim 11, wherein the metal element M' includes at least La.

13. The cathode active material according to claim 1, wherein the alloy has a composition represented by $Mn_{1-x}La_x$ wherein x is 0.1 or more and 0.5 or less.

14. A fluoride ion battery including a cathode active material layer, an anode active material layer, and an electrolyte layer formed between the cathode active material layer and the anode active material layer, wherein
   the cathode active material layer contains the cathode active material according to claim 1.

15. The fluoride ion battery according to claim 14, wherein a fluorinated M' element M'F has a higher ion conductivity than a fluorinated M element MF.

16. The fluoride ion battery according to claim 14, wherein the M' element has a lower fluorination potential than the M element.

17. The cathode active material according to claim 1, wherein the M' element is at least one of Y, Pr, Nd, Sm, Eu, Gd, Tb, Dy, Ho and Yb.

* * * * *